United States Patent [19]

Chang et al.

[11] Patent Number: 5,344,886
[45] Date of Patent: Sep. 6, 1994

[54] PROCESS FOR MAKING GRAFT PROPYLENE POLYMERS

[75] Inventors: Biau-Hung Chang, Cincinnati; Leslie Wild, Wyoming; James A. Hinnenkamp, Cincinnati, all of Ohio

[73] Assignee: Quantum Chemical Corporation, Cincinnati, Ohio

[21] Appl. No.: 62,892

[22] Filed: May 14, 1993

[51] Int. Cl.⁵ ............................................ C08F 255/02
[52] U.S. Cl. .................................. 525/285; 525/260; 525/263; 525/301; 525/302; 525/322
[58] Field of Search ............... 525/263, 285, 301, 302, 525/260, 322

[56] References Cited

U.S. PATENT DOCUMENTS

| | | | |
|---|---|---|---|
| 4,616,059 | 10/1986 | Motooka et al. | 525/285 |
| 4,753,997 | 6/1988 | Shyu et al. | 525/259 |
| 4,762,882 | 8/1988 | Okano et al. | 525/285 |
| 5,001,197 | 3/1991 | Hendewerk | 525/285 |
| 5,079,302 | 1/1992 | Lee et al. | 525/256 |
| 5,137,975 | 8/1992 | Kelusky | 525/263 |
| 5,167,848 | 12/1992 | Chung et al. | 525/285 |

OTHER PUBLICATIONS

Lambla et al., *Multiphased Polymers: Blends and Ionomers*, ACS Symposium Series 395, Chapter 3, 76–79 (1989).

*Primary Examiner*—Vasu S. Jagannathan
*Attorney, Agent, or Firm*—Gerald A. Baracka; William A. Heidrich

[57] ABSTRACT

A process for making a graft propylene copolymer in which a propylene polymer, selected from the group consisting of propylene homopolymers and propylene copolymers, is contacted with a polymerizable, unsaturated carboxylic acid or acid derivative in the presence of a coagent, said coagent selected from the group consisting of a first compound having the structural formula $$(CH_2=CR^1-O-\overset{O}{\underset{\|}{C}})_{x}R,$$

where R is a hydrocarbyl or a radical containing at least one atom of oxygen, sulfur, nitrogen, phosphorus or silicon; $R^1$ is hydrogen or $C_1$–$C_{12}$ alkyl or aryl; and x is an integer of 1 to 4, and a second compound having the structural formula $$(CH_2=CR^2-\overset{O}{\underset{\|}{C}}-O)_{y}R',$$

where R' is a hydrocarbyl or a radical containing at least one atom of oxygen, sulfur, nitrogen, phosphorus or silicon; $R^2$ is hydrogen or $C_1$–$C_{12}$ alkyl or aryl; and y is an integer of 2 to 4, and a free radical generating compound. This contact occurs at a temperature above both the melting point of the propylene polymer and the decomposition temperature of the free radical generating compound.

40 Claims, No Drawings

PROCESS FOR MAKING GRAFT PROPYLENE POLYMERS

BACKGROUND OF THE DISCLOSURE

1. Field of the Invention

The present invention is directed to a process for making a graft propylene copolymer. More particularly, the present invention is directed to an improved process for copolymerizing propylene polymers by the free-radical grafting thereon of a monomer under molten conditions.

A blend of a polyolefin and a second thermoplastic resin permits the extension of one or more uses particularly suited to the polyolefin or the second resin to the other resin to which use that other resin is unsuited. For example, polypropylene combined with nylon provides superior high temperature performance and, at the same time, good low moisture absorption characteristics. Alone a polypropylene homopolymer has poor high temperature performance. Similarly, nylon polymers are characterized by poor low moisture absorption.

A major barrier to combining a polyolefin with a second non-polyolefinic thermoplastic resin in the prior art has been the absence of compatibility of the two resins. Those skilled in the art are aware that polyolefins, being non-polar, are not compatible with other more polar thermoplastic resins. Obviously, a compatibilizing agent, which is itself compatible with the two resins, and thus permits the blending of such resins, would enhance increased utilization of the two thermoplastic resins which constitute the blend or alloy by extending the field of usefulness of those individual thermoplastics.

It is well known that a polymerizable, ethylenically unsaturated carboxylic acid or acid derivative, or as it is better known because of the common use of maleic anhydride, a maleated polyolefin, serves as an effective compatibilizer. Unfortunately, the high cost of maleated olefin copolymer compatibilizers has limited commercial development of the above discussed thermoplastic blends. Thus, there is a continuing need to develop better and more cost effective methods of preparing maleated polyolefins in order to fully exploit the potential of thermoplastic alloys and blends.

A particularly important class of maleated olefin copolymer compatibilizers are maleated polypropylene resins. The importance of this class of compatibilizers lies in the ability of this class of compatibilizers to permit the blending of polypropylene with other thermoplastics. Such compositions find particular utility in laminate and adhesive applications.

To exploit these burgeoning laminate and adhesive markets new processes have been developed to produce maleated polypropylenes. These processes involve graft copolymerization onto polypropylene of maleating agents. There are three types of graft copolymerization processes that successfully produce the desired maleated polypropylene or, more generally, ethylenically unsaturated carboxylic acid or acid derivative-propylene graft copolymers discussed above. These processes are melt graft copolymerization, solution graft copolymerization and solid state graft copolymerization. Each of these processes have their advantages and disadvantages. However, melt polymerization combines the advantages of continuous polymerization potential, which it shares with solution polymerization, and the absence of safety and health hazards, a characteristic which inhibits the use of solution polymerization processing. It is noted that although solid state copolymerization is, like melt polymerization, free of safety and health hazards, this process suffers from the inability to be operated continuously.

A particular problem associated with the graft copolymerization of polypropylene and an ethylenically unsaturated carboxylic acid or acid derivative is the necessity of including a free radical generating agent in the copolymerization reaction. Whereas free radical generating agents, such as organic peroxides, tend to effect crosslinkage of other polyolefins, they have a visbreaking effect on polypropylene. That is, the exposure of polypropylene to a free radical generating agent, opposite to other polyolefins, results in a decrease of polypropylene molecular weight. Thus, the maleation of polypropylene, that is, the copolymerization of an ethylenically unsaturated carboxylic acid or acid derivative and propylene polymer, is the most difficult of all polyolefin graft copolymerizations to effect.

2. Background of the Prior Art

There is much prior art directed to the grafting of polymerizable ethylenically unsaturated carboxylic acids or acid derivatives onto propylene polymers. The references discussed below are considered to be particularly relevant to this graft copolymerization process.

Lambla et al., *Multiphase Polymers: Blends and Ionomers*, ACS Symposium Series 395, Chap. 3, 76–79 (1989) describes a study directed to processes for producing graft copolymers of maleic anhydride and polypropylene. The results of this study establish that a process in which polypropylene is melted, in the presence of dicumyl peroxide acting as an initiator, with a stoichiometric amount of maleic anhydride and styrene produces the highest degree of grafting of the maleic anhydride onto the polypropylene polymer compared to polymerization of maleic anhydride in the absence of a coagent or maleic anhydride in the presence of the coagent buryl acrylate.

U.S. Pat. No. 5,001,197 relates to a process of maleating a polyolefin, preferably polypropylene, in which the polyolefin, especially polypropylene, molecular weight is not significantly degraded during the maleation polymerization reaction. This maleation reaction is accomplished by the use of a class of peroxide initiators which decompose to produce radical fragments having the structural formulae —R or —OR, where R is an alkyl group. Two particularly preferred peroxides within this class of initiators are t-butyl peroxypivalate and isononanoyl peroxide.

U.S. Pat. No. 5,079,302 describes a solid state free radical induced polymerization reaction involving a polymerizable polymer, usually polypropylene, which is reacted with a free radical polymerizable monomer, preferably maleic anhydride, in the presence of an allylic cyanurate or isocyanurate. This reaction occurs in the solid state, that is, at a temperature below the melting temperature of the polymeric, i.e. polypropylene, reactant.

U.S. Pat. No. 5,137,975 sets forth a method for melt grafting polypropylene with an α,β-unsaturated carboxylic acid or anhydride in the presence of a minor amount of an aqueous solution of an alkaline material. No coagent is utilized in the graft copolymerization reaction described in the U.S. Pat. No. '975 patent.

Although the processes of the above discussed references provide new methods of grafting polymerizable ethylenically unsaturated carboxylic acids or acid derivatives onto a propylene polymer they still do not provide a process which produces an effective graft propylene copolymer, i.e. a copolymer having an effectively high carboxylic acid carboxylic acid or acid derivative concentration, in commercially acceptable quantities.

BRIEF SUMMARY OF THE INVENTION

A process has now been developed for grafting a polymerizable ethylenically unsaturated carboxylic acid or acid derivative onto a propylene polymer in a continuous melt process that provides a higher degree of grafting of the acid or acid derivative onto the polymer than the processes known in the prior art. That is, the present invention overcomes the problems associated in the prior art with either too low a degree of grafting in a continuous process or noncommercial acceptable level grafting onto a propylene polymer in a batch operation.

In accordance with the present invention a process for making a graft propylene copolymer is provided. In this process a propylene polymer selected from the group consisting of propylene homopolymers and copolymers of propylene and at least one other monomer is contacted with at least one polymerizable, ethylenically unsaturated carboxylic acid or acid derivative in the presence of a free radical generating compound and a coagent, said coagent selected from the group consisting of a first compound having the structural formula

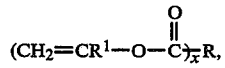

where R is a hydrocarbyl or a radical containing at least one atom of oxygen, sulfur, nitrogen, phosphorus or silicon; $R^1$ is hydrogen or $C_1$–$C_{12}$ alkyl or aryl; and x is an integer of 1 to 4, and a second compound having the structural formula

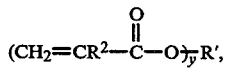

where R' is a hydrocarbyl or a radical containing at least one atom of oxygen, sulfur, nitrogen, phosphorus or silicon; $R^2$ is hydrogen or $C_1$–$C_{12}$ alkyl or aryl; and y is an integer of 2 to 4. The contact between the propylene polymer and the polymerizable, ethylenically unsaturated carboxylic acid or acid derivative, in the presence of the free radical generating compound and the coagent, occurs at a temperature above both the melting point of said propylene polymer and the decomposition temperature of said free radical generating compound.

DETAILED DESCRIPTION

The process of the present invention is directed to the graft copolymerization of a propylene polymer and a polymerizable, ethylenically unsaturated carboxylic acid or acid derivative or, as it is commonly referred to in the art, in view of the common use of maleic anhydride as the unsaturated acid derivative, the maleation of propylene polymers. Specifically, the propylene polymers within the scope of the present invention include propylene homopolymers and propylene copolymers. Any propylene homopolymer, i.e. polypropylene, may be utilized in the present invention. The copolymers of propylene preferred for use in the process of the present invention include random copolymers, block copolymers and impact copolymers. All of these copolymers are preferably propylene-α-olefin copolymers. More preferably, the α-olefin comonomer contains 2 to 12 carbon atoms. Still more preferably, the α-olefin comonomer contains 2 to 8 carbon atoms. The comonomer, whether or not an α-olefin, is furthermore preferably present in a concentration of from about 0.5 weight % up to about 40 weight %.

As suggested in the previous paragraph, the random propylene copolymers preferred for use in the present invention are propylene-α-olefin copolymers. More preferably, the random propylene copolymers within the scope of the present invention are propylene-α-olefin copolymers wherein the α-olefin comonomer contains 2 to 12 carbon atoms. Still more preferably, the random propylene copolymer is a propylene-α-olefin copolymer where the α-olefin comonomer contains 2 to 8 carbon atoms. The most preferred random copolymer is an ethylene-propylene copolymer.

Random propylene copolymers within the scope of this invention usually include between about 90% and about 99.5% by weight propylene and between about 0.5% and about 10% by weight of the comonomer. Preferably, the random copolymer includes about 94% to about 99% by weight propylene and about 1% to about 6% by weight of the comonomer.

Propylene block copolymers contemplated for use in the process of this invention are again preferably propylene-α-olefin copolymers. More preferably, this propylene-α-olefin copolymer is characterized by the α-olefin comonomer containing 2 to about 12 carbon atoms and, still more preferably, 2 to 8 carbon atoms. Most preferably, the α-olefin is ethylene.

Propylene block copolymers are primarily distinguished from the above-discussed random propylene copolymers by the concentration of the comonomer. Thus, propylene block copolymers, which are preferably propylene-α-olefin copolymers, include an α-olefin comonomer weight concentration of between about 10 weight percent and about 40 weight percent, the remainder being propylene. More preferably, the propylene block copolymers within the scope of the present invention include between about 15 weight percent and about 35 weight percent of the α-olefin comonomer with propylene contributing between about 65 weight percent and about 85 weight percent of the block copolymer.

The third class of propylene copolymers preferred for use in the process of the present invention is propylene impact copolymers. These impact copolymers are again preferably propylene-α-olefin copolymers. As in the case of random and block propylene copolymers, the comonomer is preferably an α-olefin containing 2 to about 12 carbon atoms. Still more preferably, an α-olefin containing 2 to 8 carbon atoms is employed. Most preferably, the impact copolymer is an ethylene-propylene copolymer.

Propylene impact copolymers are distinguished from random and block copolymers albeit they are also preferably propylene-α-olefin copolymer. Propylene impact copolymers may be prepared by forming a polymeric composition of a propylene homopolymer and an ethylenepropylene copolymer. Alternatively, they may be synthesized in a two-stage polymerization. In the first of these two stages gaseous propylene is contacted with a polymerization catalyst in a first, stirred reaction vessel to produce a propylene homopolymer. In the second stage, propylene and the second α-olefin are copolymerized in intimate admixture with the propylene homopolymer formed in the first polymerization stage.

Propylene impact copolymers usually comprise between about 70% to 95% propylene and between about 5% to 30% of the α-olefin comonomer. More preferably, propylene impact copolymers intended for use in the present invention include between about 6% and about 16% of the comonomer and between about 84% and 94% propylene. All of these percentages are by weight, based on the total weight of the impact copolymer.

A particularly preferred embodiment of the present invention involves the employment of an ethylene-propylene impact copolymer which comprises between about 11% and about 15% by weight ethylene and between about 85% and about 89% by weight propylene, which copolymer is characterized by a melt flow rate (MFR) of between about 0.4 and 15 g/10 min., as measured by ASTM D-1238. Even more particularly preferred is the embodiment of a propylene impact copolymer wherein the ethylene concentration is about 11.5% to about 12.7% by weight, the balance being propylene, and wherein the MFR of the impact copolymer is in the range of between about 0.8 and about 10 g/10 min.

Although impact copolymers are characterized by the above defined physical properties they are often additionally defined by their Gardner impact values. Gardner impact values of propylene impact copolymers are preferably in the range of between about 125 and about 240 inch-lbs, as measured at −18° C., in accordance with ASTM D-3029-84, Test Method "G."

It is emphasized that impact copolymers, as defined above, which are characterized by ethylene concentrations in excess of about 11% or 12% by weight, are often referred to as thermoplastic olefins (TPO) or thermoplastic olefin elastomers (TPOE). It should therefore be appreciated that TPO's and TPOE's, which are within the generic contemplation of the impact copolymers, are within the scope of the propylene polymers within the scope of the subject invention.

The comonomer grafted onto the propylene polymer in the graft copolymerization process is at least one polymerizable, ethylenically unsaturated carboxylic acid or acid derivative, such as an acid anhydride, an acid ester, an acid salt, amide, imide, or the like. Such comonomers include, but are not necessarily limited to, the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2.)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)heptene-2,3-dicarboxylic acid anhydride, maleopimaric acid, tetrahydrophthalic anhydride, norborn-5-ene-2,3-dicarboxylic acid anhydride, Nadic anhydride, methyl Nadic anhydride, Himic anhydride, methyl Himic anhydride, and methylbicyclo(2.2.1)hept-5-ene-2,3-dicarboxylic acid anhydride.

The process of the present invention occurs in the presence of a free radical generating compound, synonymously referred to as an initiator. Among the classes of compounds within the contemplation of the initiator of the present invention are organic peroxides, azo-containing compounds, azide compounds and the like.

Among the organic peroxides within the contemplation of the free radical generating compound of the present invention are diisobutyral peroxide, α-cumyl peroxyneodecanoate, acetyl cyclohexylsulfonyl peroxide, t-butyl peroxyneodecanoate, di(2-ethylhexyl) peroxydicarbonate, diisopropyl peroxydicarbonate, di(sec-butyl) peroxydicarbonate, t-amyl peroxypivalate, di(2,4-dichloro)benzoyl peroxide, t-butyl peroxypivalate, di(3,5,5-trimethylhexanoyl)peroxide, didecanoyl peroxide, didodecanoyl peroxide, 2,5-di(2-ethylhexanoylperoxy)-2,5-dimethylhexane, diacetyl peroxide, t-amyl peroxy-2-ethylhexanoate, t-butyl peroxy-2-ethylhexanoate, dibenzoyl peroxide, t-butyl peroxyisobutyrate, 1,1-di(t-butylperoxy)-3,3,5-trimethylcyclohexane, 1,1-di(t-butylperoxy)cyclohexane, OO-t-butyl hydrogen monoperoxymaleate, OO-t-butyl O-isopropyl monoperoxycarbonate, 2,5-di(benzoylperoxy)-2,5-dimethylhexane, t-butyl peroxy-3,5,5-trimethylhexanoate, t-butyl peroxyacetate, 2,2-di(t-butylperoxy)butane, t-butyl peroxybenzoate, ethyl 3,3-di(t-butylperoxy)-butyrate, dicumyl peroxide, 1,3-di[α-(t-butylperoxy)isopropyl]benzene, 2,5-di(t-butylperoxy)-2,5-dimethylhexane, di-t-amyl peroxide, di-t-butyl peroxide, 2,5-diperbenzoyl-2,5-dimethylhexyne-3, p-methane hydroperoxide, 2,5-hydroperoxy-2,5-dimethylhexane, cumene hydroperoxide, t-amyl hydroperoxide, t-butyl hydroperoxide, methyl ethyl ketone peroxide, 2,4-pentanedione peroxide, peroxyacetic acid, 3-chloroperoxybenzoic acid and the like.

Of these peroxides diisobutyral peroxide, diisopropyl peroxydicarbonate, t-amyl peroxypivalate, t-butyl peroxypivalate, t-amyl peroxy-2-ethylhexanoate, t-butyl peroxy-2-ethylhexanoate, t-butyl peroxyisobutyrate, t-butyl peroxyacetate, t-butyl peroxybenzoate, dicumyl peroxide, di-t-amyl peroxide and di-t-butyl peroxide are preferred.

Dicumyl peroxide, di-t-amyl peroxide and di-t-butyl peroxide are particularly preferred for use as the organic peroxide in the process of the present invention.

Among the azo compounds within the scope of preferred free radical generating compounds are 2,2'-azobis(2,4-dimethylvaleronitrile), 2,2'-azo(2-methylpropane)(2,4-dimethyl-4-methoxyvaleronitrile), 2,2'-azobis(isobutyronitrile), 2,2'-azo(2-methylpropane)(2,4-dimethylvaleronitrile), 2,2'-azo(2-methylpropane)(2-methylpropionitrile), 2,2'-azo(2-methylpropane)(2-methylbutyronitrile), 2,1-azo(2-methylpropane)(1-cyanocyclohexane) and 2,1-azo(2methylbutane)(1-cyanocyclohexane).

The melt graft copolymerization process of the present invention involving the reaction of a propylene polymer with an unsaturated compound, in the presence of a free radical generating compound, also critically requires the presence of a coagent. The coagent of the present invention is selected from the group consisting of one of the two below discussed formulae.

The first coagent within the contemplation of the present invention is a compound having the structural formula

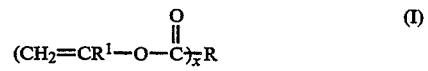

where R is a hydrocarbyl or a radical containing at least one atom of oxygen, sulfur, nitrogen, phosphorus or silicon; $R^1$ is hydrogen or $C_1$–$C_{12}$ alkyl or aryl; and x is an integer of 1 to 4.

Preferably, the first coagent is a compound having the structural formula I where R is an aliphatic hydrocarbyl containing 1 to 18 carbon atoms; $R^1$ is hydrogen or methyl; and x is 1 or 2.

More preferably, the first coagent is a compound having the structural formula I where R is $C_1$–$C_{12}$ alkyl; $R^2$ is hydrogen; and x is 1.

The second coagent within the contemplation of the present invention is a compound having the structural formula

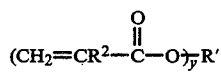
(II)

where R' is a hydrocarbyl or a radical containing at least one atom of oxygen, sulfur, nitrogen, phosphorus or silicon; $R^2$ is hydrogen or $C_1$–$C_{12}$ alkyl or aryl; and y is an integer of 2 to 4.

Preferably, the second coagent is a compound having the structural formula II where R' is an aliphatic hydrocarbyl containing 1 to 12 carbon atoms; $R^2$ is hydrogen or methyl; and y is an integer of 2 to 4.

More preferably, the second coagent is a compound having the structural formula II where R' is an aliphatic hydrocarbyl containing 2 to 6 carbon atoms; $R^2$ is hydrogen; and y is an integer of 2 to 4.

The process of the present invention requires that the contacting of the above-discussed components in the graft copolymerization of propylene polymers occur at a temperature above both the melting point of the propylene polymer and the decomposition temperature of the free radical generating compound. This permits the reaction to occur in the molten state. By conducting the process in the molten liquid state, the process can be operated continuously. At the same time, conducting the copolymerization reaction in the molten state eliminates the need for employing a solvent which, although like molten state operation permits liquified and thus continuous processing, introduces safety and health hazards. Those skilled in the art are aware that many solvents, in which propylene polymers are soluble, present safety and health hazards.

Another advantage of eschewing the use of a solvent lies in the elimination of a separation step wherein the solvent is removed. This separation step is energy intensive. Thus, the cost associated with maintaining the reaction in the molten state is at least partially compensated for by the absence of a separation step to remove the solvent. Of course, this advantage is in addition to the major safety and environmental advantages associated with solvent-free processing.

In a preferred embodiment the graft copolymerization process occurs at a temperature in the range of between about 120° C. and about 350° C. More preferably, the copolymerization reaction is conducted at a temperature in the range of between about 175° C. and about 250° C. Still more preferably, the temperature at which graft copolymerization occurs is in the range of between about 185° C. and about 225° C. Most preferably the copolymerization reaction temperature is in the range of between about 195° C. and about 205° C.

In the process of the present invention the propylene polymer is contacted with the comonomer such that the comonomer is present in a concentration in the range of between about 0.01% and about 20% by weight, based on the weight of the propylene polymer charged into the reaction zone.

Preferably, the comonomer is charged into the reactor in a concentration of between about 0.1% and about 10% by weight. More preferably, this comonomer concentration is in the range of between about 0.5% and about 5% by weight. As stated above, these percentages are based on the weight of propylene polymer charged into the copolymerization reactor.

The coagent is introduced into the copolymerization reactor in a concentration of between about 0.01% and about 30% by weight, again based on the weight of the propylene charged into the reactor.

Preferably, the coagent is included in the graft propylene copolymerization reaction in a concentration in the range of between about 0.1% and 10% by weight. More preferably, the coagent is present in an amount ranging from about 0.5% to about 5% by weight, said percentages based on the weight of the propylene polymer reactant.

The free radical generating compound, preferably an organic peroxide, is present in a concentration of between about 0.001% and about 20% by weight, based on the weight of the propylene polymer in the reactor. Preferably, the free radical generating compound, usually an organic peroxide, is present in a concentration in the range of between about 0.05% and about 1.0% by weight. More preferably, the free radical generating compound is present in a concentration of between about 0.1% and about 0.7% by weight, these percentages based on the weight of the propylene polymer.

The graft copolymerization reaction is preferably conducted in a reactor that provides intimate contact between the components introduced therein. To that end, it is especially preferred that the reactor be in the form of an extruder which provides such intimate contact.

The following examples are given to illustrate the scope of the present invention. Since these examples are given for illustrative purposes only, the invention should not be deemed limited thereto.

EXAMPLE 1

Maleation of Polypropylene Homopolymer Using Vinyl Laurate as Coagent in a Single Screw Extruder A polypropylene homopolymer (200 g.) in powder form having a melt flow rate of 5 g/10 min., as determined by ASTM Standard Test Method D-1238, a flexural modulus of 210,000 psi, as determined by ASTM Standard Test Method D-790 Procedure B, a notched Izod value, as determined at 23° C. in accordance with ASTM Standard Test Method D 256, of 0.6 ft.-lbs. per inch, a Gardner impact strength, determined at 23° C. in accordance with ASTM Standard Test Method D-3029, Procedure G, of 200 inch-pounds and a heat deflection temperature at 66 psi of 105° C., as determined by ASTM Standard Test Method D-648 was preblended with a solution of maleic anhydride (MAH) (6 g.), a coagent and di-t-butyl peroxide (1.2 g.) dissolved in toluene (4 g.) such that the solution was absorbed into the polypropylene homopolymer.

The thus absorbed polymer was introduced into a Brabender Model EX 200 [trademark] extruder. This extruder was driven by a 4 horsepower motor which permitted a rotational velocity of from 10 rpm to 110 rpm with normal operation at 40 rpm. The extruder was provided with two temperature controlled mixing zones ($Z_1$ and $Z_2$) and a heated temperature controlled ⅛ inch die zone ($Z_3$). The extruder was provided with ¾ inch diameter single screw constructed of chrome-plated steel. The screw of the extruder was further characterized a length to diameter ratio (L/D) of 20.

The extruder was operated at a temperature such that the two mixing zones, $Z_1$ and $Z_2$, as well as the die zone, $Z_3$ were all maintained at 200° C. At the average 40 rpm screw rotational running rate, 3 pounds of product was produced per hour.

In this example the coagent component, included in the solution absorbed into the polypropylene homopolymer, was vinyl laurate. It was present such that the molar ratio of the coagent to maleic anhydride was 0.5, representative of 3.47% by weight, based on the weight of the propylene polymer.

The product exiting the extruder was purified to remove any unreacted maleic anhydride and analyzed to determine the amount of maleic anhydride grafted onto the propylene polymer, in this case, a polypropylene homopolymer having a MFR of 5. This analysis involved contacting a sample of the graft copolymer with a 5% solution of ethanol in xylene. This contact resulted in the formation of the maleic half ester. The resultant titration with a base determined the acid number, from which the concentration of maleic anhydride, grafted onto the propylene polymer, was calculated.

This example is summarized in Table I.

EXAMPLES 2 TO 4

Maleation of Propylene Homopolymer Using Different Coagents in a Single Screw Extruder Example 1 was identically reproduced in a series of examples except for the identify of the coagent. In these six examples different coagents within the contemplation of the present invention were employed in accordance with the procedure employed in Example 1. The only distinction, other than the identify of the coagent, was the concentration of the coagent as a weight percentage of the polypropylene homopolymer. It is emphasized, however, that this distinction is totally dependent upon the molecular weight of the coagent since the molar ratio of 0.5 of the coagent to maleic anhydride, employed in Example 1, was retained in these examples.

Examples 2 to 4, including the resultant concentration of maleic anhydride grafted onto the graft copolymer product, as determined in accordance with the method set forth in Example 1, is included in Table I.

COMPARATIVE EXAMPLES 1 AND 2

Maleation of Propylene Homopolymer Using No Coagent or Coagent Outside the Scope of the Present Invention in a single screw Extruder Example 1 was identically reproduced in two additional examples but for the employment of the coagent of Example 1. In Comparative Example 1 no coagent was employed. In Comparative Example 2 the coagent utilized, butyl acrylate, although structurally similar to the coagents of Examples 1 to 4, within the contemplation of the present invention, differs therefrom in that although butyl acrylate is structurally similar to these coagents, it has a structural formula outside the scope of compounds having the structural formula I or II.

Comparative Examples 1 and 2 are tabulated in Table I.

TABLE I

Maleation of Polypropylene Homopolymer[1]

| Exam No. | Coagent, wt %[2] | W/in Scope of Formula | Molar Ratio, Coagent/MAH | MAH Grafted, Wt %[2] | Graft Eff., %[3] |
|---|---|---|---|---|---|
| 1 | Vinyl laurate, 3.47 | I | 0.5 | 1.99 | 66 |
| 2 | Vinyl Acetate, 1.32 | I | 0.5 | 1.40 | 47 |
| 3 | Hexamethylene-1,6-diacrylate, 3.47 | II | 0.5 | 2.69 | 90 |
| 4 | Pentaerythritol tetraacrylate, 5.40 | II | 0.5 | 1.76 | 59 |
| CE1 | None | | 0 | 0.72 | 24 |
| CE2 | Butyl acrylate, 1.96 | | 0.5 | 1.00 | 33 |

Footnotes
[1] See Table IV.
[2] Based on the weight of the polypropylene homopolymer having a MFR of 5.
[3] Based on MAH grafted onto polypropylene homopolymer as a fraction of stoichiometric MAH amount graftable.

EXAMPLES 5 AND 6

Maleation of Propylene Impact Copolymer Using Coagents in a Single Screw Extruder A propylene-ethylene impact copolymer (200 g.), summarized in Table IV, containing 91% by weight propylene and 9% by weight ethylene characterized by a melt flow rate of 0.7 g/10 min, a flexural modulus of 115,000 psi, a notched Izod of 15 ft.-lbs./in., a Gardner impact strength of more than 240 in-lbs., measured at −18° C., and a heat deflection temperature, at 66 psi, of 85° C., as determined by the ASTM standard tests defined in Example 1, was preblended with a solution of maleic anhydride (8.0 g.), di-t-butyl peroxide (1.2 g.), and a coagent, whose identity and concentration is given in Table II, all dissolved in toluene (4.0 g.).

The thus preblended polymer was introduced into the single screw extruder employed in Example 1. The extruder was run in accordance with the conditions present in the graft copolymerization reaction of Example 1 but for a slight elevation in temperature. Whereas zones $Z_1$, $Z_2$ and $Z_3$ of the extruder were maintained at 200° C. in Example 1, in Examples 8 to 10 the temperature of zones $Z_1$, $Z_2$ and $Z_3$ were raised to 215° C.

A summary of these examples, including the identify and amounts of the coagents, are provided in Table II.

COMPARATIVE EXAMPLE 3

Maleation of Propylene Impact Copolymer in a Single Screw Extruder Without a Coagent This comparative example was conducted in identical conformity with Examples 5 and 6 with the sole exception that no coagent was employed. That is, the toluene solution, preblended with the propylene impact copolymer, contained no coagent.

A summary of this example is included in Table II.

TABLE II

Maleation of Propylene Impact Copolymer[1]

| Exam. No. | Coagent | Coagent, wt % | Molar Ratio, Coagent/MAH | MAH Grafted, Wt % | Graft Eff., % |
|---|---|---|---|---|---|
| 5 | Vinyl laurate | 4.62 | 0.5 | 3.47 | 87 |
| 6 | Vinyl | 1.76 | 0.5 | 2.69 | 67 |

TABLE II-continued

Maleation of Propylene Impact Copolymer[1]

| Exam. No. | Coagent | Coagent, wt % | Molar Ratio, Coagent/ MAH | MAH Grafted, Wt % | Graft Eff., % |
|---|---|---|---|---|---|
| CE3 | acetate None | | 0 | 1.13 | 28 |

Footnote
[1]See Table IV.

EXAMPLE 7

Maleation of Propylene Impact Copolymer Using Vinyl Acetate as Coagent in Twin-Screw Extruder The propylene impact copolymer utilized in Examples 5 and 6 was fed into the inlet of a Werner-Pfleiderer Model ZSK-30 [trademark]twin-screw extruder at a rate of 15 lbs/hr. A solution of maleic anhydride, vinyl acetate and di-t-butyl peroxide in acetone was prepared and introduced into the extruder such that the rates of addition were 0.675 lb/hr, 0.39 lb/hr and 0.06 lb/hr, respectively. The solution provided a total acetone feed rate into the extruder of 0.675 lb/hr. These feed rates resulted in maleic anhydride and vinyl acetate weight concentrations, based on the weight of the propylene homopolymer, tabulated in Table III, which table summarizes this example.

The twin-screw extruder of this example was provided with nine heating zones wherein the first zone, $Z_1$, was the upstreammost zone and $Z_9$, the last zone, was the downstreammost zone. In this example extruder heating was as follows: $Z_1$ to $Z_4$ were at 180° C.; $Z_5$ was at 190° C., $Z_6$ to $Z_8$ were at 200° C.; and $Z_9$ was at 190° C.

It is emphasized that the determination of weight percent maleic anhydride (MAH) grafted onto the impact copolymer was determined in accordance with the procedure set forth in Example 1.

TABLE III

Maleation of Propylene Impact Copolymer[1] in Twin-Screw Extruder

| Exam. No. | Propylene Polymer | Coagent, wt % | Molar Ratio, Coagent/ MAH | MAH Grafted, wt % | Graft Eff,. % |
|---|---|---|---|---|---|
| 7 | Impact Copolymer | Vinyl acetate, 2.6 | 0.66 | 3.47 | 77 |

Footnote
[1]See Table IV.

The above embodiments and examples are provided to illustrate the scope and spirit of the present invention. These embodiments and examples will be apparent, to those skilled in the art, other embodiments and examples. These other embodiments and examples are within the contemplation of the present invention. Therefore, the present invention should be limited only by the appended claims.

What is claimed is:

1. A process for making a graft propylene copolymer comprising contacting a propylene polymer, said propylene polymer selected from the group consisting of propylene homopolymers and propylene copolymers, with at least one polymerizable, ethylenically unsaturated carboxylic acid or acid derivative in the presence of a coagent, said coagent, present in a concentration of between about 0.01% and about 30% by weight, based on the weight of the propylene polymer, selected from the group consisting of a first compound having the structural formula

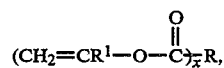

where R is a hydrocarbyl or a radical containing at least one atom of oxygen, sulfur, nitrogen, phosphorus or silicon; $R^1$ is hydrogen or $C_1$–$C_{12}$ alkyl or aryl; and x is an integer of 1 to 4, and a second compound having the structural formula

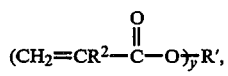

where R' is a hydrocarbyl or a radical containing at least one atom of oxygen, sulfur, nitrogen, phosphorus or silicon; $R^2$ is hydrogen or $C_1$–$C_{12}$ alkyl or aryl; and y is an integer of 2 to 4, and a free radical generating compound, said process conducted at a temperature above both the melting point of said propylene polymer and the decomposition temperature of said free radical generating compound.

2. A process in accordance with claim 1 wherein said contact occurs at a temperature in the range of between about 120° C. and about 350° C.

3. A process in accordance with claim 2 wherein said contact occurs at a temperature in the range of between about 175° C. and about 250° C.

4. A process in accordance with claim 3 wherein said contact occurs at a temperature in the range of between about 185° C. and about 225° C.

5. A process in accordance with claim 1 wherein said contact among said propylene polymer, said polymerizable, ethylenically unsaturated carboxylic acid or acid

TABLE IV

Definition of Propylene Polymers

| Polymer | Wt % Propylene | Wt % Ethylene | MFR[1] | Flex. Mod.[2] | Notched Izod[3] | Gardner Impact[4] | Heat Def. Temp.[5] |
|---|---|---|---|---|---|---|---|
| Propylene Homopolymer | 100 | 0 | 5 | 210 | 0.6 | 200 | 105 |
| Propylene Impact Copolymer | 91 | 9 | 0.7 | 115 | 1.5 | >240 | 85 |

Footnotes
[1]Melt flow rate in g/10 min. as determined by ASTM D 1238.
[2]Flexural modulus in Kpsi as determined by ASTM D 790B.
[3]Notched Izod strength in foot-pounds per inch as determined by ASTM D 256.
[4]Gardner impact strength in inch-pounds as determined by ASTM D 3029G.
[5]Heat deflection temperature at 66 psi in °C. as determined by ASTM D 648.

derivative, said free radical generating compound and said coagent occurs in an extruder.

6. A process in accordance with claim 1 wherein said polymerizable, unsaturated carboxylic acid or acid derivative is present in a concentration in the range of between about 0.01% and about 20% by weight, based on the weight of the propylene polymer.

7. A process in accordance with claim 6 wherein said polymerizable, unsaturated carboxylic acid or acid derivative is present in a concentration in the range of between about 0.1% and about 10%

8. A process in accordance with claim 7 wherein said polymerizable, unsaturated carboxylic acid or acid derivative is present in a concentration in the range of between about 0.5% and about 5%.

9. A process in accordance with claim 1 wherein said coagent is present in a concentration in the range of between about 0.1% and about 10%.

10. A process in accordance with claim 9 wherein said coagent is present in a concentration in the range of between about 0.5% and about 5%.

11. A process in accordance with claim 1 wherein said free radical generating compound is selected from the group consisting of organic peroxides, azo compounds and azide compounds.

12. A process in accordance with claim 11 wherein said free radical generating compound is an organic peroxide.

13. A process in accordance with claim 12 wherein said organic peroxide is present in a concentration no higher than 20% by weight, based on the weight of said propylene polymer.

14. A process in accordance with claim 13 wherein said organic peroxide is present in a concentration in the range of between about 0.05% and about 1.0% by weight, based on the weight of said propylene polymer.

15. A process in accordance with claim 14 wherein said organic peroxide is present in a concentration in the range of between about 0.1% and about 0.7% by weight.

16. A process in accordance with claim 12 wherein said organic peroxide is selected from the group consisting of diisobutyral peroxide, diisopropyl peroxydicarbonate, t-amyl peroxypivalate, t-butyl peroxypivalate, t-amyl peroxy-2-ethylhexanoate, t-butyl peroxy-2-ethylhexanoate, t-butyl peroxyisobutyrate, t-butyl peroxyacetate, t-butyl peroxybenzoate, dicumyl peroxide, di-t-amyl peroxide and di-t-butyl peroxide.

17. A process in accordance with claim 16 wherein said organic peroxide is selected form the group consisting of dicumyl peroxide, di-t-amyl peroxide and di-t-butyl peroxide.

18. A process in accordance with claim 11 wherein said free radical generating compounds is an azo-containing compound selected from the group consisting of 2,2'-azobis(2,4-dimethylvaleronitrile), 2,2'-azo(2-methylpropane)(2,4-dimethyl-4-methoxyvaleronitrile), 2,2'-azobis(isobutyronitrile), 2,2'-azo(2-methylpropane)(2,4-dimethylvaleronitrile), 2,2'-azo(2-methylpropane)(2,4-dimethylvaleronitrile), 2,2'-azo(2-methylpropane)(2-dimethylpropionitrile), 2,2'-azo(2-methylpropane)(2-methylbutyronitrile, 2,1-azo(2-methylpropane)(1-cyanocyclohexane) and 2,1-azo(2-methylbutane)(1-cyanocyclohexane).

19. A process in accordance with claim 1 wherein said propylene polymer is selected from the group consisting of propylene homopolymers and propylene copolymers.

20. A process in accordance with claim 19 wherein said propylene polymer is a propylene homopolymer.

21. A process in accordance with claim 19 wherein said propylene polymer is a propylene copolymer selected from the group consisting of propylene random copolymers, propylene block copolymers and propylene impact copolymers.

22. A process in accordance with claim 21 wherein said propylene copolymer is a propylene-$\alpha$-olefin copolymer wherein the $\alpha$-olefin comonomer contains 2 to 12 carbon atoms and is present in a concentration of between about 0.5% and about 40%, said percentages being by weight, based on the total weight of the copolymer.

23. A process in accordance with claim 22 wherein said propylene-$\alpha$-olefin copolymer is selected from the group consisting of a propylene-$\alpha$-olefin random copolymer which includes between about 0.5% and about 10% of the $\alpha$-olefin comonomer, said $\alpha$-olefin monomer containing 2 to 8 carbon atoms, and a propylene-$\alpha$-olefin impact copolymer which includes between about 5% and about 30% of the $\alpha$-olefin comonomer, said $\alpha$-olefin comonomer containing 2 to 8 carbon atoms, said percentages being by weight, based on the total weight of the copolymer.

24. A process in accordance with claim 23 wherein said propylene-$\alpha$-olefin copolymer is selected from the group consisting of a propylene-ethylene random copolymer containing between about 1% and about 6% by weight ethylene, based on the total weight of the copolymer, and a propylene-ethylene impact copolymer containing between about 6% and about 16% by weight ethylene, based on the total weight of the copolymer.

25. A process in accordance with claim 1 wherein said polymerizable, ethylenically unsaturated carboxylic acid or acid derivative is maleic anhydride.

26. A process in accordance with claim 1 wherein said coagent is said first compound.

27. A process in accordance with claim 26 wherein R is an aliphatic hydrocarbyl containing 1 to 12 carbon atoms; $R^1$ is hydrogen or methyl; and x is 1 or 2.

28. A process in accordance with claim 27 wherein R is $C_1$–$C_{18}$ alkyl; $R^1$ is hydrogen; and x is 1.

29. A process in accordance with claim 1 wherein said coagent is said second compound.

30. A process in accordance with claim 29 wherein R' is an aliphatic hydrocarbyl containing 1 to 12 carbon atoms; and $R^2$ is hydrogen or methyl.

31. A process in accordance with claim 30 wherein R' is an aliphatic hydrocarbyl containing 2 to 6 carbon atoms; and $R^2$ is hydrogen.

32. A process of maleating a propylene polymer comprising contacting a propylene polymer with maleic anhydride in the presence of a coagent, said coagent present in a concentration of between about 0.01% and bout 30% by weight, based on the weight of the propylene polymer, selected from the group consisting of a first compound having the structural formula

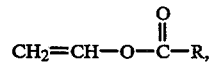

where R is $C_1$–$C_{18}$ alkyl, and a second compound having the structural formula

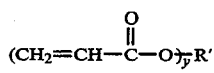

where R' is an alphatic hydrocarbyl containing 2 to 6 carbon atoms; and y is an integer of 2 to 4, and an organic peroxide, said process conducted at a temperature in excess of the melting point of the propylene polymer and the decomposition temperature of the organic peroxide.

33. A process in accordance with claim 32 wherein said propylene polymer is selected from the group consisting of a propylene homopolymer, a propylene-ethylene random copolymer and a propyleneethylene impact copolymer.

34. A process in accordance with claim 33 wherein said organic peroxide is selected from the group consisting of dicumyl peroxide, di-t-amyl peroxide and di-t-butyl peroxide.

35. A process in accordance with claim 34 wherein said coagent is selected for the group consisting of vinyl laurate, vinyl acetate, hexamethylene-1,6-diacrylate and pentaerythritol tetraacrylate.

36. A process in accordance with claim 35 wherein said contact occurs at a temperature in the range of between about 185° C. and about 225° C.

37. A process in accordance with claim 36 wherein said contact occurs in an extruder.

38. A process in accordance with claim 37 wherein said maleic anhydride is present in a concentration of between about 0.5% and about 5% by weight, based on the weight of said propylene polymer.

39. A process in accordance with claim 38 wherein said organic peroxide is present in a concentration of between about 0.1% and about 0.7% by weight, based on the weight of the propylene polymer.

40. A process in accordance with claim 39 wherein said coagent is present in a concentration of between about 0.5% and 5% by weight, based on the weight of the propylene polymer.

* * * * *

UNITED STATES PATENT AND TRADEMARK OFFICE
CERTIFICATE OF CORRECTION

PATENT NO. : 5,344,886

DATED : September 6, 1994

INVENTOR(S): B.H. Chang; L. Wild; J.A. Hinnenkamp

It is certified that error appears in the above-identified patent and that said Letters Patent is hereby corrected as shown below:

<u>Col. 13</u>

Claim 7, line 9, after "10%" insert --.--

Claim 17, line 48, "form" should read --from--

Claim 18, line 58, delete "propane)(2,4-dimethylvaleronitrile), 2,2'-azo(2-methyl-"; line 59, "dimethylpropionitrile" should read --methylpropionitrile--

<u>Col. 14</u>

Claim 32, line 59, "bout" should read --about--.

Signed and Sealed this

Second Day of May, 1995

Attest:

*Attesting Officer*

BRUCE LEHMAN

*Commissioner of Patents and Trademarks*